Figure 1:
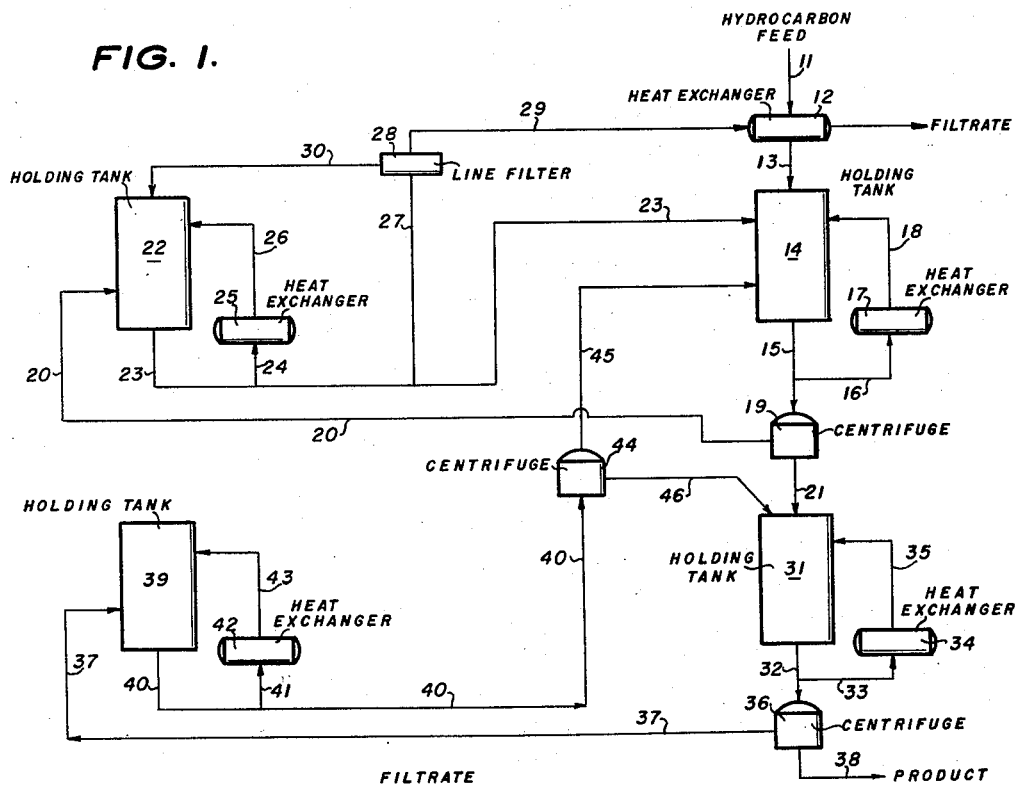

INVENTORS.
Samuel Bozich,
Everett W. Lewis,
Buford D. Smith,
BY
ATTORNEY.

United States Patent Office 2,913,503
Patented Nov. 17, 1959

2,913,503

PROCESS FOR RECOVERY OF CRYSTALLIZABLE HYDROCARBONS FROM CRYSTALLINE SLURRIES IN STAGES

Samuel Bozich, Everett W. Lewis, and Buford D. Smith, Baytown, Tex., assignors, by mesne assignments, to Esso Research and Engineering Company, Elizabeth, N.J., a corporation of Delaware Application December 27, 1955, Serial No. 555,405

17 Claims. (Cl. 260—666)

The present invention is directed to a method of recovering crystallizable hydrocarbons. More particularly, the invention is directed to separating crystallizable hydrocarbons from mixtures thereof with other hydrocarbons boiling in the range from about 150° F. to about 500° F. In its more specific aspects, the invention has to do with the recovery of cyclohexane and aromatic hydrocarbons from fractions containing same.

The present invention may be briefly described as a method for separating a crystallizable hydrocarbon from a mixture thereof with other hydrocarbons boiling in the range from about 150° F. to about 500° F. The crystallizable hydrocarbon is present in the mixture in an amount at least 70% by weight of the mixture and the feed mixture is cooled to form a first crystalline slurry of the crystallizable hydrocarbon. A first filtrate is separated from the crystalline slurry either by filtration, centrifugation or a combination of centrifugation and filtration. A second crystalline slurry is then formed from the first filtrate and a second filtrate is separated by filtering or centrifuging or a combination of the two from at least a portion of the crystallizable hydrocarbon. The crystallizable hydrocarbon separated from the second slurry is returned either to the first or the second slurry. A third crystalline slurry of the crystallizable hydrocarbon is formed from the crystallizable hydrocarbon separated from the first slurry and a third filtrate is separated from the crystallizable hydrocarbon in the third slurry. A fourth crystalline slurry is formed from the third filtrate and a fourth filtrate is separated from the fourth slurry. The fourth filtrate is admixed with the first slurry and the crystallizable hydrocarbon separated from the fourth slurry is admixed with the third slurry. The purified product is recovered from the third slurry.

The first, second, third and fourth slurries are preferably maintained at a selected substantially constant temperature for a time in the range from about ¼ hour to about 2 hours for growth of crystals in the slurry to a readily separable form. The temperature of the first slurry is preferably maintained higher than the temperature of the second slurry and the temperature of the third slurry is preferably maintained higher than the first and second slurries. The temperature of the fourth slurry is maintained at a temperature higher than the temperatures of the first and second slurries but lower than the temperature of the third slurry to insure best results.

The present invention also encompasses a method for separating crystallizable hydrocarbons having a feed purity as indicated in which the feed mixture is cooled to a temperature sufficiently low to form a crystalline slurry, first filtrate is separated from the crystallizable hydrocarbon in the first slurry and a second crystalline slurry is formed from the first filtrate. Thereafter, second filtrate is separated from at least a portion of the crystallizable hydrocarbons in the second slurry and the crystallizable hydrocarbons separated from the second slurry are returned to either the first or second slurries and purified product is recovered from the first slurry.

The present invention contemplates that the second filtrate may be substantially completely separated from the crystallizable hydrocarbons in the second slurry and that the crystallizable hydrocarbons separated from the second slurry be admixed with the first slurry. It is further contemplated in the present invention that the first and second slurries be maintained at a selected substantially constant temperature with the temperature at which the second slurry is maintained different than the temperature of the first slurry. Ordinarily the temperature of the second slurry will be lower than the temperature of the first slurry. It is contemplated in the practice of the present invention that the second slurry may be divided into first and second streams with the second filtrate being separated from the first stream to provide a fourth stream which is admixed with the second slurry and the second stream is admixed with the first slurry.

The feed hydrocarbon employed in the practice of the present invention suitably boils in the range from about 150° F. to about 500° F. and suitably may be selected from a wide variety of petroleum fractions or hydrocarbon fractions. For example, fractions boiling in this range from crude petroleum, thermal and catalytical products such as products from catalytic cracking, either a fixed bed or fluidized operations, and many others of a suitable nature containing a crystallizable hydrocarbon may form the feed stock of this invention. The feed stock of the present invention suitably contains at least 70% by weight of the crystallizable hydrocarbon in the mixture. Preferably the feed mixture consists essentially of about 80 to 90% by weight of the crystallizable hydrocarbon although higher purity feeds may be and are further purified in this invention.

The crystallizable hydrocarbon may suitably be cyclohexane, benzene, ortho and paraxylenes, tertamethyl benzene, such as durene, naphthalene, and its derivatives and other aromatic and naphthenic hydrocarbons boiling in the range given. Preferred feed stocks are cyclohexane-containing feeds, benzene-containing feeds, xylene-containing feeds and durene-containing feeds.

The present invention is of considerable utility and advantage in that by practicing the present invention it is possible to obtain crystallizable hydrocarbons in substantial purity. For example, in the practice of the present invention it is possible to obtain cyclohexane having a purity of 97, 98 and 99+% by weight. It is also possible to obtain para and orthoxylenes in substantial purity of the order indicated. In the practice of the present invention, it is possible to obtain high purity in excess of 99% without sacrifice of throughput. In other words, high purity may be obtained at high yields of the crystallizable hydrocarbon while charging the feed mixture at commercial rates. The present invention is of advantage also in that it is no longer necessary to distill fractionally the feed stocks to form very narrow boiling fractions. In other words, it is possible to operate on fractions of relatively wide boiling range. In other words, the invention is advantageous in that a minimum amount of equipment is utilized to obtain a maximum purity of product.

Figure 2:
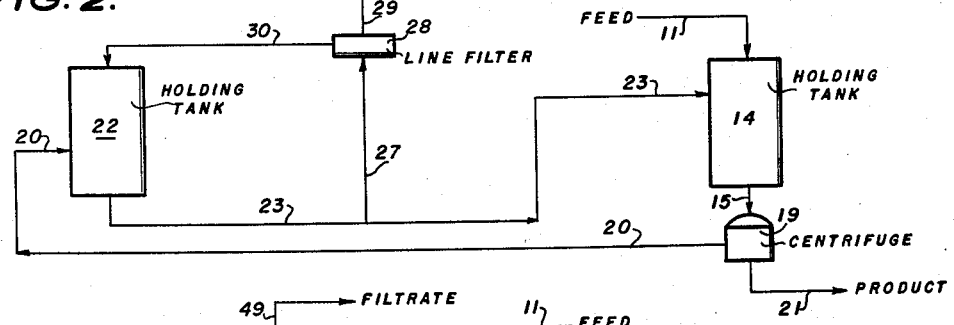
Figure 3:
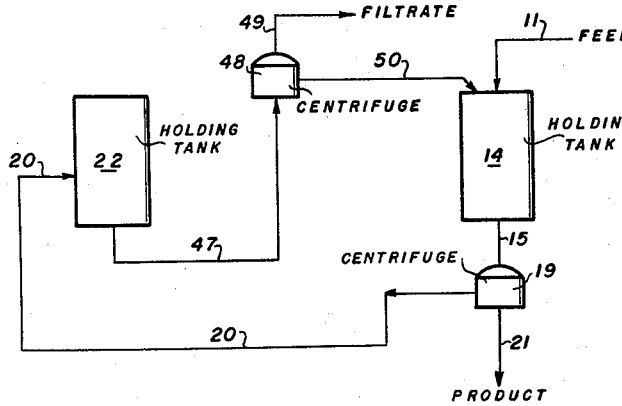

The present invention will be further illustrated by reference to the drawing in which Fig. 1 is a flow diagram of a preferred mode;

Fig. 2 is a flow diagram of another embodiment of the invention especially suitable for obtaining high yields of cyclohexane; and Fig. 3 is a still further embodiment of the present invention especially suitable for obtaining high purity of cyclohexane.

Referring now to the drawing in which identical numerals will be employed to identify identical parts and particularly to Fig. 1, a feed hydrocarbon fraction boiling in the range of from about 174 to 188° F. and containing about 88% cyclohexane is introduced into the system from a source, not shown, by line 11. The feed mixture passes through a heat exchange means 12 wherein the temperature is reduced to a temperature in the range of −55 to +5° F. and it is then discharged by way of line 13 into a holding tank 14 provided with a line 15, a recycle line 16, a heat exchanger 17 and a discharge line 18 by way of which the temperature in holding tank 14 is maintained by recycling crystalline slurry through lines 15 and 16, heat exchanger 17 and line 18. For a feed stock containing 88% cyclohexane of the nature described, a temperature of approximately −2° F. is suitably maintained in holding tank 14. A feed stock of this nature held at this temperature will provide a slurry in holding tank 14 having a solids content of about 20% by weight.

The slurry in line 15 is discharged into a centrifuge indicated by the numeral 19 operating at a sufficient rate to separate a filtrate and a crystalline cake. The filtrate is withdrawn by way of line 20 for further handling, as will be described, and the crystalline cake is discharged by line 21 for further processing, as also will be described. The filtrate in line 20 which may contain approximately 86.7% by weight cyclohexane is discharged by line 20 into a second holding tank 22 which is similar in all respects to holding tank 14. A slurry stream is withdrawn from holding tank 22 by way of line 23 and discharged in part by way of line 24 into a heat exchanger 25 and thence back by way of line 26 into holding tank 22. By employing the heat exchanger 25, a temperature of about −30° F. is maintained in holding tank 22 and the slurry may have a solids content of about 36% by weight for the feed stock being processed.

Another portion of the slurry in line 23 is discharged by way of line 27 into an isothermal filter 28 by way of which a filtrate is discharged by way of line 29 which passes in heat exchange through heat exchanger 12 with the feed introduced by line 11. The slurry from the isothermal filter 28 is discharged by line 30 into holding tank 22.

A third stream of the slurry is discharged by line 23 into the holding tank 14 for admixture with the first slurry.

The crystalline cake discharged from centrifuge 19 by line 21 is introduced into a liquid or solid condition into a third holding tank generally indicated by the numeral 31 which is provided with a discharge line 32 for the slurry, a recycle line 33 and a heat exchanger 34 and line 35 for re-introduction of the material recycled through heat exchanger 34 back into the holding tank 31. The holding tank 31 with a feed stock of the nature described may operate at a temperature of about 38.7° F. and with a slurry solids content of about 11% by weight.

The slurry in line 32 which is not recycled is introduced thereby into a centrifuge 36 which operates at a sufficient rate to separate a filtrate from the crystallized cyclohexane by way of line 37 and a highly purified product by way of line 38. For example, the purified product obtained by way of line 38 may have a purity of approximately 99.6% by weight of cyclohexane.

The filtrate is discharged by way of line 37 into a fourth holding tank 39 provided with a slurry line 40, a recycle line 41, a heat exchanger 42 and a slurry discharge line 43. The slurry is recycled through lines 40, 41, heat exchanger 42 and line 43 to holding tank 39 to maintain therein a temperature of about 36° F. and from a slurry having a solids content of about 35% by weight.

The slurry in line 40 is introduced thereby into a centrifuge 44 wherein a separation is made between the cyclohexane and the mother liquor to form a filtrate which is withdrawn by line 45 and introduced thereby into the first holding tank 14 for admixture with the first slurry while the crystalline cake is withdrawn by line 46 and discharged thereby into the third holding tank 31 for admixture with the third slurry.

By practicing the invention as set out in the embodiment of Fig. 1, substantial yields of high purity products are obtained. For example, with a feed stock of 88% cyclohexane charged in an amount of 1253 barrels per day in line 11 there is obtained in line 38 500 barrels per day of cyclohexane of 99.6% purity.

Referring now to Fig. 2, a feed stock, such as described with respect to Fig. 1, is introduced by way of line 11 into a holding drum or tank 14 which is similar to that of Fig. 1 which is operated with a temperature of about −49° F. to obtain a first slurry having a solids content of about 23% by weight. The slurry is withdrawn by line 15 into centrifuge 19 to separate cyclohexane of about 97% purity by way of line 21. The filtrate from centrifuge 19 discharges by way of line 20 into a second holding drum or tank 22 with the slurry being withdrawn therefrom by way of line 23 and divided into two parts with the first part being introduced into an isothermal filter 28 and the other part being discharged by line 23 into the first slurry in tank 14. A description and operation of the line filter may be found in application Serial No. 434,964, filed June 7, 1954, for John M. Powers. Filtrate is withdrawn from the line filter 28 by line 29 while the slurry is introduced from the line filter 28 into holding tank 22 by line 30.

In the embodiment of Fig. 2, the third and fourth holding tanks have been omitted and also the attendant heat exchange equipment. It will be understood, however, that the necessary heat exchange equipment is included in the embodiment of Fig. 2 but the third and fourth holding tanks may be omitted and yet obtain high purity products and high yields. For example, while operating in the embodiment of Fig. 2 charging 1000 barrels per day of 88% purity cyclohexane, it is possible to recover by way of line 21, 711 barrels per day of 97% purity of cyclohexane. In other words, high yields of high purity products are obtained in the embodiment of Fig. 2.

Referring now to Fig. 3, a cyclohexane fraction having a purity of about 98% by weight is charged by way of line 11 to a holding tank or drum 14 maintained at a temperature of about 38.7° F. With this feed stock and the temperatures in holding tank 14, a crystalline slurry having a solids content of about 11% by weight is obtained. The slurry is discharged by way of line 15 into centrifuge 19 operating at a sufficient rate to produce a cake of cyclohexane which is discharged by line 21 and a filtrate charge is withdrawn by line 20. The filtrate in line 20 is introduced thereby into holding tank or drum 22 maintained at a temperature of about 36° F. and under conditions to form a slurry having a solids content of about 35% by weight. The slurry from holding tank 22 is withdrawn therefrom by way of line 47 and introduced thereby into a centrifuge 48 operating at a sufficient rate to form a filtrate which is withdrawn by way of line 49 and a crystalline cake which is discharged by line 50 into the holding tank 14 for admixture with the first slurry. Operating under conditions as set out hereinbefore with a feed stock of the nature described, it is possible to recover from 1000 barrels per day of feed stock of 98% purity, 238 barrels per day of product of 99.6% cyclohexane.

In the embodiment of Fig. 3 it will be understood that heat exchangers, such as in Fig. 1, are provided for the first and second holding tanks but in this embodiment the third and fourth holding tanks are omitted and yet substantial yields of high purity product is obtained.

It is to be noted that the embodiment of Fig. 3 is similar to the embodiment of Fig. 1 with respect to the arrangement of the third and fourth holding tanks and the attendant equipment. It is to be emphasized, however, that the embodiment of Fig. 3 may form a separate processing operation to recover high purity crystallizable hydrocarbons from enriched mixtures thereof.

In order to compare the practice of the present invention with a conventional operation, a feed stock such as used in Fig. 2 is charged to a prior art first stage holding tank and maintained at a temperature of −25° F. to obtain a slurry having a solids content of 35% by weight. This slurry is then centrifuged to separate cyclohexane therefrom and the filtrate is sent to a second holding tank at a temperature of −71° F. to form a slurry of a solids content of 35% by weight. A slurry is removed from the second holding tank, centrifuged to remove filtrate and crystalline cyclohexane is recovered. The combined cyclohexane cakes amount to 650 barrels per day of 97% purity of cyclohexane which is to be compared with the embodiment of Fig. 2 which allows the production of 711 barrels per day of 97% cyclohexane.

Comparing a prior art operation with the embodiment of Fig. 3, a cyclohexane feed containing 98% cyclohexane was charged to a first holding tank operating at a temperature of 37.4° F. to form a slurry having a solids content of 2% by weight. This slurry was then centrifuged to separate a crystalline cake and a filtrate and the filtrate was then formed in a second slurry in a second holding tank at 37.2° F. to form a slurry having a solids content of 2% by weight. The second slurry was also centrifuged to separate filtrate and to recover cyclohexane cake. The combined cyclohexane cakes had a purity of 99.47% and amounted to 119 barrels per day recovered from 1000 barrels per day of feed stock. This is to be compared with the 99.6% purity cyclohexane amounting to 238 barrels per day recovered from 1000 barrels per day of feed stock while operating in accordance with the present invention.

In practicing the present invention with feed stocks of the nature described, the temperature in the first holding tank may be in the range from about −100° to about +110° F., while the temperature in the second holding tank may be maintained at a temperature from about −100° to about 0° F. The temperature in the second holding tank is different from and preferably lower than the temperature in the first holding tank. The temperature in the third holding tank may be in the range from about −30° to about +175° F. and is higher than the temperatures in the first and second holding tanks. The temperature in the fourth holding tank is lower than the temperature in the third holding tank but is higher than the temperatures in the first and second holding tanks and suitably may range from about −35° to about +170° F.

It will be seen from the several descriptions of the present invention that a new and improved process has been devised in which product of high purity may be obtained from the first stage of a crystalline separation system. This is obtained by providing a so-called internal recycle of the filtrate separated by the centrifuging operation. The filtrate is formed into a second slurry which is maintained at a selected substantially constant temperature and then a crystalline cake separated from the second slurry is returned either to the first slurry or to the second slurry depending on whether the operation is for obtaining the highest purity product possible or for obtaining high purity products with high yields. Ordinarily, it will be preferred to return the crystalline cake from an isothermal filter to admixture with the second slurry.

It is to be understood in the practice of the present invention, in either or all of the operations involving the several slurries which are maintained in two or more holding tanks and maintained at selected substantially constant temperatures in the several holding tanks, that the crystalline hydrocarbon cake may be returned thereto either in a liquid condition or as a solid.

In order to illustrate the invention further, a conventional operation is employed to produce 97% cyclohexane using the following steps: Charge 1000 barrels of 88% by weight cyclohexane concentrate, chill to produce a slurry containing 35% solids, filter and charge the filtrate to a second stage, chill to produce a slurry containing 35% solids, separate the solids and combine the solids with the solids from the first stage. Reject the filtrate from the second stage. Yield: 650 barrels of 97% cyclohexane, or 65% of feed. Rejected filtrate: 350 barrels of 71.5% cyclohexane.

In comparison to this operation, the process of the present invention is employed to reduce 97% cyclohexane employing the following steps: Charge 1000 barrels of 88% by weight cyclohexane, chill to produce slurry containing 23% solids, separate solids as product, chill filtrate to produce a slurry containing 35% solids by chilling and removing excess mother liquor, heat solids and return to first slurry. It is unnecessary to melt the solids prior to return to the first slurry; however, under certain conditions heat may be added to liquefy to facilitate handling. Yield: 711 barrels of 97% product, 71.1% of feed. Rejected filtrate: 289 barrels of 65.8% cyclohexane.

It will be noted in the conventional operation that 350 barrels of 71.5% cyclohexane is rejected, whereas in the present invention only 289 barrels of 65.8% cyclohexane is discarded.

When it is attempted to produce 98% cyclohexane in a conventional procedure such as set out above, in this operation, only 20 barrels of cyclohexane of 98% purity is obtained. In an operation according to the present invention charging 1000 barrels of cyclohexane of 88% purity 330 barrels of 98% cyclohexane is obtained.

In a conventional operation to produce 99+% cyclohexane from 1000 barrels of feed of 88% by weight purity, a 48.5% yield of 99.1% cyclohexane is obtained. As compared to this operation employing the embodiment of Fig. 1 in the present invention, the yield of cyclohexane from this feed stock of 88% purity is 66.7% by weight of 99.1% purity.

In similar operations attempting to make 99.6% purity cyclohexane in the conventional mode, it is not possible to produce cyclohexane of this purity, whereas in the embodiment of Fig. 1 a yield of 32% of 99.6% cyclohexane is obtained.

The present invention has been used in producing commercial quantities of cyclohexane of 99% purity employing the embodiment of Fig. 2.

It will be seen from the foregoing several examples and the description taken with the drawing that a new and improved process has been provided by way of which high yields of high purity crystallizable hydrocarbons may be obtained from mixtures thereof. While the examples are directed to recovery of cyclohexane, these are examples given for purposes of illustration only and not by way of limitation since other feed stocks of the nature described supra may be used.

Compositions of typical feed stocks are given in the following table:

Table

| Hydrocarbon feed: | Composition |
|---|---|
| (1) Paraxylene (xylenes from hydroformate) | 83% paraxylene. 4.2% orthoxylene. 8.3% metaxylene. 3.7% ethylbenzene. 0.4% toluene. 0.4% $C_9$ and heavier aromatics. |
| (2) Orthoxylene (xylenes from hydroformate) | 85% orthoxylene. 10% metaxylene. 4% paraxylene. 1% other. |
| (3) Durene (cut from aromatic solvent, Solvesso 150, cut 375–395° F.) | 70% durene. Balance is principally other $C_{10}$ aromatics with isodurene largest single contaminant. |
| (4) Benzene (extracted and distilled from plant hydroformate) | 85% benzene. Balance is $C_6$ and $C_7$ paraffins, isoparaffins, naphthenes, and unsaturates. |

The nature and objects of the present invention having been completely described and illustrated, what we wish to claim as new and useful and to secure by Letters Patent is:

1. A method for separating a crystallizable cyclic hydrocarbon from a mixture thereof with other hydrocarbons boiling in the range from about 150° F. to about 500° F. in which the crystallizable hydrocarbon is at least 70% by weight of the mixture which comprises cooling said mixture to a temperature sufficiently low to form a first slurry containing crystals of said crystallizable hydrocarbon, maintaining said first slurry at a selected substantially constant temperature for a time in the range from about one-quarter to about two hours for growth of crystals to a readily separable form, separating first filtrate from said crystals in said first slurry, forming a second slurry containing crystals of said crystallizable hydrocarbon by cooling sufficiently said first filtrate, maintaining said second slurry at a selected substantially constant temperature lower than the temperature of the first slurry for a time in the range from about ¼ to about 2 hours for growth of crystals to a readily separable form, separating second filtrate from at least a portion of said crystals in said second slurry, returning the crystals separated from the second slurry to one of said slurries, and recovering as a purified product the crystals separated from the first filtrate.

2. A method in accordance with claim 1 in which the second filtrate is substantially completely separated from said crystals in said second slurry and the crystals separated from the second slurry are admixed with the first slurry.

3. A method in accordance with claim 1 in which the second slurry is divided into first and second streams with the second filtrate being separated from the first stream to provide a fourth stream which is admixed with the second slurry and the second stream being admixed with the first slurry.

4. A method for separating a crystallizable cyclic hydrocarbon from a mixture thereof with other hydrocarbons boiling in the range from about 150° F. to about 500° F. in which the crystallizable hydrocarbon is at least 70% by weight of the mixture which comprises cooling said mixture to a temperature sufficiently low to form a first slurry containing crystals of said crystallizable hydrocarbon, maintaining said first slurry at a selected substantially constant temperature for a time in the range from about one-quarter to about two hours for growth of crystals to a readily separable form, separating first filtrate from said crystals in said first slurry, forming a second slurry containing crystals of said crystallizable hydrocarbon by cooling sufficiently said first filtrate, maintaining said second slurry at a selected substantially constant temperature lower than the temperature of the first slurry, separating second filtrate from at least a portion of said crystals in said second slurry, returning the crystals separated from the second slurry to one of said slurries supra, forming a third slurry containing crystals of said crystallizable hydrocarbon by warming sufficiently the crystals separated from the first slurry, maintaining said third slurry at a selected substantially constant temperature higher than the temperatures of the first and second slurries, separating third filtrate from said crystals in said third slurry, forming a fourth slurry containing crystals by cooling sufficiently the third filtrate, maintaining said fourth slurry at a selected substantially constant temperature higher than the temperatures of the first and second slurries but lower than the temperature of the third slurry, separating a fourth filtrate from said crystals in said fourth slurry, admixing the fourth filtrate with the first slurry, admixing the crystals separated from the fourth slurry with the third slurry, and recovering said separated crystals from the third slurry as a purified product, said second, third, and fourth slurries also being maintained at said temperatures for a time in the range from about one-quarter to about two hours for growth of crystals to a readily separable form.

5. A method for separating cyclohexane from a mixture thereof with other hydrocarbons boiling in the range from about 150° F. to about 200° F. in which the cyclohexane is at least 70% by weight of the mixture which comprises cooling said mixture to a temperature sufficiently low to form a first crystalline slurry of said cyclohexane, maintaining said slurry of cyclohexane at a selected substantially constant temperature for a time in the range from about one-quarter to about two hours for growth of crystals to a readily separable form, separating first filtrate from said cyclohexane crystals in said first slurry, forming a second crystalline slurry of said cyclohexane by cooling sufficiently said first filtrate, maintaining said second slurry at a selected substantially constant temperature lower than the temperature of the first slurry for a time in the range from about ¼ to about 2 hours for growth of crystals to a readily separable form, separating second filtrate from at least a portion of said cyclohexane crystals in said second slurry, returning the cyclohexane crystals separated from the second slurry to one of said slurries, and recovering as a purified product the cyclohexane crystals separated from the first slurry.

6. A method in accordance with claim 5 in which the cyclohexane mixture contains approximately 88% cyclohexane and boils in the range from about 160° to about 190° F.

7. A method in accordance with claim 5 in which the second filtrate is substantially completely separated from said cyclohexane crystals in said second slurry and the cyclohexane crystals separated from the second slurry is admixed with the first slurry.

8. A method in accordance with claim 5 in which the second slurry is divided into first and second streams with the second filtrate being separated from the first stream to provide a fourth stream which is admixed with the second slurry, and the second stream being admixed with the first slurry.

9. A method for separating a xylene from a mixture thereof with at least one other isomeric xylene boiling in the range from about 150° F. to about 500° F. in which the xylene is at least 70% by weight of the mixture which comprises cooling said mixture to a temperature sufficiently low to form a first crystalline slurry of said xylene, maintaining said slurry of xylene at a selected substantially constant temperature for a time in the range from about one-quarter to about two hours for growth of crystals to a readily separable form, separating first filtrate from said xylene crystals in said first slurry, forming a second crystalline slurry of said xylene by cooling sufficiently said first filtrate, maintaining said second slurry at a selected substantially constant temperature lower than the temperature of the first slurry for a time in the range from about ¼ to about 2 hours for growth of crystals to a readily separable form, separating second filtrate from at least a portion of said xylene crystals in said second slurry, returning the xylene crystals separated from the second slurry to one of said slurries, and recovering as a purified product the xylene crystals separated from the first slurry.

10. A method in accordance with claim 9 in which the second filtrate is substantially completely separated from said xylene crystals in said second slurry and the xylene crystals separated from the second slurry is admixed with the first slurry.

11. A method in accordance with claim 9 in which the second slurry is divided into first and second streams with the second filtrate being separated from the first stream to provide a fourth stream which is admixed with the second slurry, and the second stream being admixed with the first slurry.

12. A method in accordance with claim 9 in which the xylene is orthoxylene.

13. A method in accordance with claim 9 in which the xylene is paraxylene.

14. A method for separating a crystallizable aromatic hydrocarbon from a mixture thereof with other hydrocarbons boiling in the range from about 150° F. to about 500° F. in which the crystallizable hydrocarbon is at least 70% by weight of the mixture which comprises cooling said mixture to a temperature sufficiently low to form a first slurry containing crystals of said crystallizable hydrocarbon, maintaining said first slurry at a selected substantially constant temperature for a time in the range from about one-quarter to about two hours for growth of crystals to a readily separable form, separating first filtrate from said crystals in said first slurry, forming a second slurry containing crystals of said crystallizable hydrocarbon by cooling sufficiently said first filtrate, maintaining said second slurry at a substantially constant temperature lower than the temperature of the first slurry for a time in the range from about ¼ to about 2 hours for growth of crystals to a readily separable form, separating second filtrate from at least a portion of said crystals in said second slurry, returning the crystals separated from the second slurry to one of said slurries, and recovering as a purified product from the first slurry the crystallizable hydrocarbon from which the first filtrate is separated.

15. A method in accordance with claim 14 in which the aromatic hydrocarbon is benzene.

16. A method in accordance with claim 14 in which the aromatic hydrocarbon is xylene.

17. A method in accordance with claim 14 in which the aromatic hydrocarbon is durene.

References Cited in the file of this patent

UNITED STATES PATENTS

| | | |
|---|---|---|
| 2,383,174 | Weir | Aug. 21, 1945 |
| 2,540,977 | Arnold | Feb. 6, 1951 |
| 2,543,055 | Pool et al. | Feb. 27, 1951 |
| 2,688,045 | Powers | Aug. 31, 1954 |
| 2,776,328 | Bennett et al. | Jan. 1, 1957 |
| 2,820,070 | Bennett et al. | Jan. 14, 1958 |